US012683213B2

(12) United States Patent
Li et al.

(10) Patent No.: US 12,683,213 B2
(45) Date of Patent: Jul. 14, 2026

(54) DC/DC CONVERSION CIRCUIT, POWER UNIT, CHARGING PILE, AND CHARGE-DISCHARGE HEATING METHOD

(71) Applicant: CONTEMPORARY AMPEREX TECHNOLOGY (HONG KONG) LIMITED, Hong Kong (CN)

(72) Inventors: Zhanliang Li, Ningde City (CN); Zhimin Dan, Ningde City (CN); Yu Yan, Ningde City (CN); Xiaojian Huang, Ningde City (CN); Xiyang Zuo, Ningde City (CN); Yuanmiao Zhao, Ningde City (CN); Xiao Wang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 825 days.

(21) Appl. No.: 17/896,107

(22) Filed: Aug. 26, 2022

(65) Prior Publication Data

US 2023/0231218 A1 Jul. 20, 2023

Related U.S. Application Data

(63) Continuation of application No. PCT/CN2022/072104, filed on Jan. 14, 2022.

(51) Int. Cl.
*H01M 10/633* (2014.01)
*B60L 58/27* (2019.01)
(Continued)

(52) U.S. Cl.
CPC ........... *H01M 10/633* (2015.04); *B60L 58/27* (2019.02); *H01M 10/615* (2015.04); *H01M 10/625* (2015.04); *H02J 7/865* (2026.01)

(58) Field of Classification Search
CPC ............ H01M 10/615; H01M 10/625; H01M 10/633; H02J 7/00; H02J 7/0068; B60L 58/27
(Continued)

(56) References Cited

U.S. PATENT DOCUMENTS

2011/0144861 A1 6/2011 Lakirovich et al.
2013/0181682 A1 7/2013 Yoshioka et al.

FOREIGN PATENT DOCUMENTS

CN 202423513 U 9/2012
CN 202435108 U 9/2012
(Continued)

OTHER PUBLICATIONS

Machine translation of CN 202423513 U (Year: 2012).*
(Continued)

*Primary Examiner* — Kevin P Kerns
(74) *Attorney, Agent, or Firm* — XSENSUS LLP

(57) ABSTRACT

Embodiments of this application provide a DC/DC conversion circuit, a power unit, a charging pile, and a charge-discharge heating method. The circuit includes: a first rectifier module, where an input end of the first rectifier module is connected to a power grid through an AC/DC conversion circuit; a transformer module, where an input end of the transformer module is connected to an output end of the first rectifier module; an energy storage module; and a second rectifier module, where an input end of the second rectifier module is configured to connect to an output end of the transformer module or the energy storage module, and an output end of the second rectifier module is configured to connect to a battery pack of an electric vehicle when the charging pile is charging the electric vehicle.

20 Claims, 6 Drawing Sheets

(51) Int. Cl.
    *H01M 10/615*      (2014.01)
    *H01M 10/625*      (2014.01)
    *H02J 7/00*      (2026.01)

(58) Field of Classification Search
    USPC ........................................................... 429/62
    See application file for complete search history.

(56)               References Cited

FOREIGN PATENT DOCUMENTS

| | | | |
|---|---|---|---|
| CN | 107276187 | A | 10/2017 |
| CN | 111181208 | A | 5/2020 |
| CN | 110133516 | B | 2/2021 |
| CN | 212579671 | U | 2/2021 |
| CN | 112599889 | A | 4/2021 |
| CN | 213734672 | U | 7/2021 |
| CN | 113659244 | A | 11/2021 |
| CN | 113733986 | A | 12/2021 |
| CN | 114851918 | A | 8/2022 |
| DE | 10 2013 226372 | A1 | 6/2015 |
| EP | 3439137 | A1 * | 2/2019 ............. B60L 55/00 |
| WO | 2012/056543 | A1 | 5/2012 |

OTHER PUBLICATIONS

Decision to Grant a Patent issued Feb. 13, 2024 in Japanese Patent Application No. 2022-532609 with English translation thereof, 5 pages.

International Search Report and Written Opinion mailed on Aug. 2, 2022, received for PCT Application PCT/CN2022/072104, filed on Jan. 14, 2022, 11 pages including English Translation.

Extended European Search Report issued Mar. 22, 2023 in corresponding European Patent Application No. 22735760.5, 10 pages.

Office Action issued May 21, 2026 in Chinese Patent Application No. 202280004705.3 with English translation thereof.

* cited by examiner

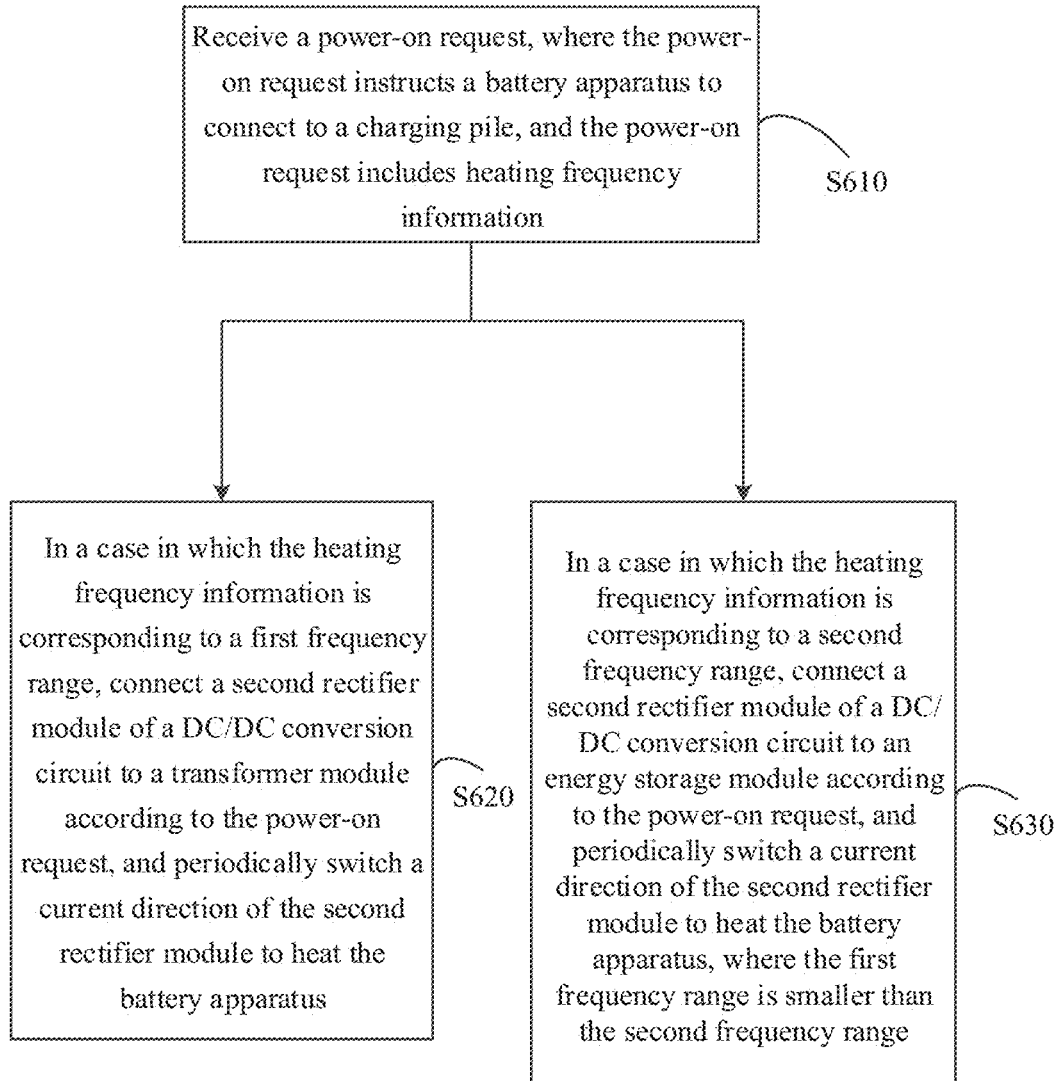

Receive a power-on request, where the power-on request instructs a battery apparatus to connect to a charging pile, and the power-on request includes heating frequency information

S610

In a case in which the heating frequency information is corresponding to a first frequency range, connect a second rectifier module of a DC/DC conversion circuit to a transformer module according to the power-on request, and periodically switch a current direction of the second rectifier module to heat the battery apparatus

S620

In a case in which the heating frequency information is corresponding to a second frequency range, connect a second rectifier module of a DC/DC conversion circuit to an energy storage module according to the power-on request, and periodically switch a current direction of the second rectifier module to heat the battery apparatus, where the first frequency range is smaller than the second frequency range

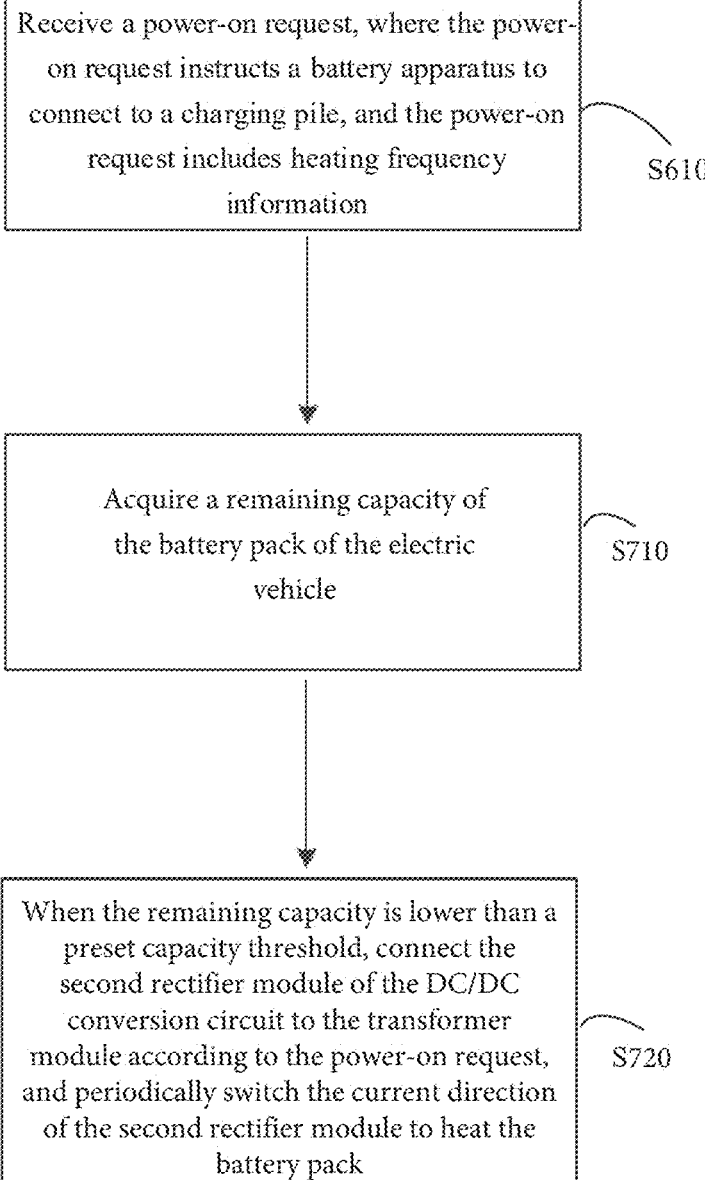

Receive a power-on request, where the power-on request instructs a battery apparatus to connect to a charging pile, and the power-on request includes heating frequency information

S610

Acquire a remaining capacity of the battery pack of the electric vehicle

S710

When the remaining capacity is lower than a preset capacity threshold, connect the second rectifier module of the DC/DC conversion circuit to the transformer module according to the power-on request, and periodically switch the current direction of the second rectifier module to heat the battery pack

DC/DC CONVERSION CIRCUIT, POWER UNIT, CHARGING PILE, AND CHARGE-DISCHARGE HEATING METHOD

CROSS-REFERENCE TO RELATED APPLICATION

The present application is a continuation of International Application No. PCT/CN2022/072104, filed Jan. 14, 2022, the entire contents of which is incorporated herein by reference in its entirety.

TECHNICAL FIELD

This application relates to the field of battery technologies, and in particular, to a DC/DC conversion circuit, a power unit, a charging pile, and a charge-discharge heating method.

BACKGROUND

With the development of new energy technologies, battery application becomes wider. Under low temperature conditions, charging efficiency of a battery pack of an electric vehicle is relatively low, so the battery pack needs to be heated to a temperature within its operating temperature range. Then, the battery pack can be charged efficiently by the charging pile.

In related technologies, a heating module is generally added inside the electric vehicle to quickly heat the battery pack, so as to solve the problem of low charging efficiency under low temperature conditions. However, entire-vehicle production costs will certainly increase if an extra heating apparatus is provided on every electric vehicle. To reduce the entire-vehicle production costs, related technologies propose that a heating apparatus is provided inside the charging pile and cyclic charging-discharging of the battery pack is performed through the heating apparatus to heat the battery pack.

However, a current direction of direct current needs to be switched constantly inside the charging pile for cyclic charging-discharging of the battery pack. As for existing charging piles, one charge-discharge switchover generally takes approximately one second. Such a switchover speed brings out unsatisfying battery pack heating effects. Furthermore, the charge-discharge switchover speed of the charging pile is affected by performance of an internal component, so the switchover speed cannot be increased by adjusting a charge-discharge control mode.

SUMMARY

Embodiments of this application provide a DC/DC conversion circuit, a power unit, a charging pile, and a charge-discharge heating method, so as to solve the problem of a low charge-discharge switchover speed of the charging pile and unsatisfying battery pack heating effects.

According to a first aspect, this application provides a DC/DC conversion circuit, applied to a charging pile. The DC/DC conversion circuit includes:

a first rectifier module, where an input end of the first rectifier module is connected to a power grid through an AC/DC conversion circuit;

a transformer module, an input end of the transformer module is connected to an output end of the first rectifier module;

an energy storage module; and a second rectifier module, where an input end of the second rectifier module is configured to connect to an output end of the transformer module or connect to the energy storage module, and an output end of the second rectifier module is configured to connect to a battery pack of an electric vehicle when the charging pile is charging the electric vehicle.

The second rectifier module is configured to connect to the transformer module and perform charging and discharging between the power grid and the battery pack within a first frequency range to heat the battery pack; or configured to connect to the energy storage module and perform charging and discharging between the energy storage module and the battery pack within a second frequency range to heat the battery pack. The first frequency range is smaller than the second frequency range.

When the charging pile charges an electric vehicle, if a lower frequency is required for charge-discharge switchover, the second rectifier module is connected to the transformer module. In this case, the battery pack is charged and discharged periodically through the AC/DC conversion circuit and the DC/DC conversion circuit to heat the battery pack. If a higher frequency is required for charge-discharge switchover, the second rectifier module is connected to the energy storage module, the battery pack can be charged and discharged at a higher frequency through oscillatory discharge among the battery pack, the second rectifier module and the energy storage module. This accelerates healing of the battery pack and therefore improves the battery pack heating effects. Through a connection between the second rectifier module and the energy storage module, when the battery pack requires a high-frequency pulse current, the high-frequency pulse current can be generated through the connection with the energy storage module, so that the battery pack is quickly heated at a low temperature by means of high-frequency charging and discharging.

In an optional implementation, the DC/DC conversion circuit further includes:

a first switch, where the input end of the second rectifier module is connected to the output end of the transformer module through the first switch, and the first switch is configured to connect the second rectifier module to the transformer module; and a second switch, where the input end of the second rectifier module is connected to the energy storage module through the second switch, and the second switch is configured to connect the second rectifier module to the energy storage module.

When the first switch and the second switch are provided, the charging pile can output a high-frequency positive and negative pulse current to the battery pack by adjusting on/off statuses of the first switch and the second switch. In this way, high-frequency charging and discharging is performed on the battery pack, so as to heat the battery pack.

In an optional implementation, the second rectifier module includes:

a first MOS tube, where a first end of the first MOS tube is connected to a first electrode of the output end of the transformer module through the first switch, and a second end of the first MOS tube is configured to connect to a first electrode of the battery pack;

a second MOS tube, where a first end of the second MOS tube is connected to a second electrode of the output end of the transformer module, and a second end of the second MOS tube is configured to connect to the first electrode of the battery pack;

a third MOS tube, where a first end of the third MOS tube is connected to the first electrode of the output end of the transformer module through the first switch, and a second end of the third MOS tube is configured to connect to a second electrode of the battery pack;

a fourth MOS tube, where a first end of the fourth MOS tube is connected to the second electrode of the output end of the transformer module, and a second end of the fourth MOS tube is configured to connect to the second electrode of the battery pack.

The second rectifier module is configured to: charge the battery pack when the first MOS tube and the fourth MOS tube are conductively connected; and discharge the battery pack when the second MOS tube and the third MOS tube are conductively connected.

The battery pack can be charged and discharged by controlling alternate connection of the four MOS tubes. Furthermore, an upper limit of the charge-discharge frequency is merely affected by switch frequency performance of the MOS tubes. The charge-discharge frequency can also be adjusted accordingly by adjusting a frequency of a MOS tube connection signal.

In an optional implementation, the first end of the first MOS tube is connected to a first end of the energy storage module through the second switch, and the first end of the second MOS tube is connected to a second end of the energy storage module.

Because the energy storage module is disposed to directly connect to the second rectifier module, the energy storage module can be connected to the battery pack merely through the second rectifier module. This reduces a quantity of components used between the energy storage module and the battery pack, and therefore avoids influence from component performance on the charge-discharge switchover speed.

In an optional implementation, the energy storage module is an energy storage inductor or an energy storage capacitor.

In an optional implementation, the second rectifier module is further configured to: connect to the transformer module, and charge and discharge, within the first frequency range, the battery pack whose remaining capacity is lower than a preset capacity threshold, so as to heat the battery pack.

When the remaining capacity of the battery pack is relatively low, the battery pack is connected to the transformer module through the second rectifier module. In this way, the battery pack can still be charged and discharged in a cyclic manner and heated.

According to a second aspect, this application provides a power unit applied to the charging pile. The power unit includes the foregoing DC/DC conversion circuit, and also includes an AC/DC conversion circuit. An input end of the AC/DC conversion circuit is connected to a power grid, and an output end of the AC/DC conversion circuit is connected to an input end of the DC/DC conversion circuit.

According to a third aspect, this application provides a charging pile. The charging pile includes the foregoing power unit, and also includes a main control module. The main control module is respectively connected to each of the power units.

The main control module is configured to connect the second rectifier module in the DC/DC conversion circuit of the power unit to a transformer module or to an energy storage module, and periodically switch a current direction of the second rectifier module to heat a battery pack.

In an optional implementation, the charging pile includes at least two power units.

The main control module is further configured to connect in parallel a plurality of the power units based on a heating power of the battery pack, or connect in series the DC/DC conversion circuits of the plurality of the power units based on a charging voltage of the battery pack.

According to a fourth aspect, this application provides a charge-discharge heating method, applied to a charging pile. The charge-discharge heating method includes:

receiving a power-on request, where the power-on request instructs a battery apparatus to connect to the charging pile, and the power-on request includes heating frequency information; and in a case in which the heating frequency information is corresponding to a first frequency range, connecting a second rectifier module of a DC/DC conversion circuit to a transformer module according to the power-on request, and periodically switching a current direction of the second rectifier module to heat the battery apparatus; or in a case in which the heating frequency information is corresponding to a second frequency range, connecting a second rectifier module of a DC/DC conversion circuit to an energy storage module according to the power-on request, and periodically switching a current direction of the second rectifier module to heat the battery apparatus, where the first frequency range is smaller than the second frequency range.

The heating frequency of the battery pack is acquired through the main control module of the charging pile. Therefore, a corresponding charge-discharge mode may be adopted to perform charge-discharge heating on the battery pack. When the battery pack requires a high heating frequency, high-frequency charging and discharging may be performed on the battery pack, so as to increase a charge-discharge switchover speed and improve battery pack heating effects.

In an optional implementation, after the receiving a power-on request, the method further includes:

acquiring a remaining capacity of the battery pack of an electric vehicle; and under the condition that the remaining capacity is lower than a preset capacity threshold, connecting the second rectifier module of the DC/DC conversion circuit to the transformer module according to the power-on request, and periodically switching a current direction of the second rectifier module to heat the battery pack.

When the remaining capacity of the battery pack is relatively low, the battery pack is connected to the transformer module through the second rectifier module. In this way, the battery pack can still be charged and discharged in a cyclic manner and heated.

According to the DC/DC conversion circuit, the power unit, the charging pile, and the charge-discharge heating method provided in the embodiments of this application, a power grid can be connected through the AC/DC conversion circuit. When the charging pile charges an electric vehicle, if a lower frequency is required for charge-discharge switchover, the second rectifier module is connected to the transformer module. In this case, the battery pack is charged and discharged periodically through the AC/DC conversion circuit and the DC/DC conversion circuit to heat the battery pack. If a higher frequency is required for charge-discharge switchover, the second rectifier module is connected to the energy storage module, the battery pack can be charged and discharged at a higher frequency through oscillatory discharge among the battery pack, the second rectifier and the energy storage module. This accelerates heating of the battery pack and therefore improves the battery pack heating effects. Through a connection between the second rectifier module and the energy storage module, when the battery pack requires a high-frequency pulse current, the high-frequency pulse current can be generated through the connection with the energy storage module, so that the battery pack is quickly heated at a low temperature by means of high-frequency charging and discharging.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

FIGS. 6 and 7 are schematic flowcharts of charge-discharge heating methods according to embodiments of this application.

Figure 1:
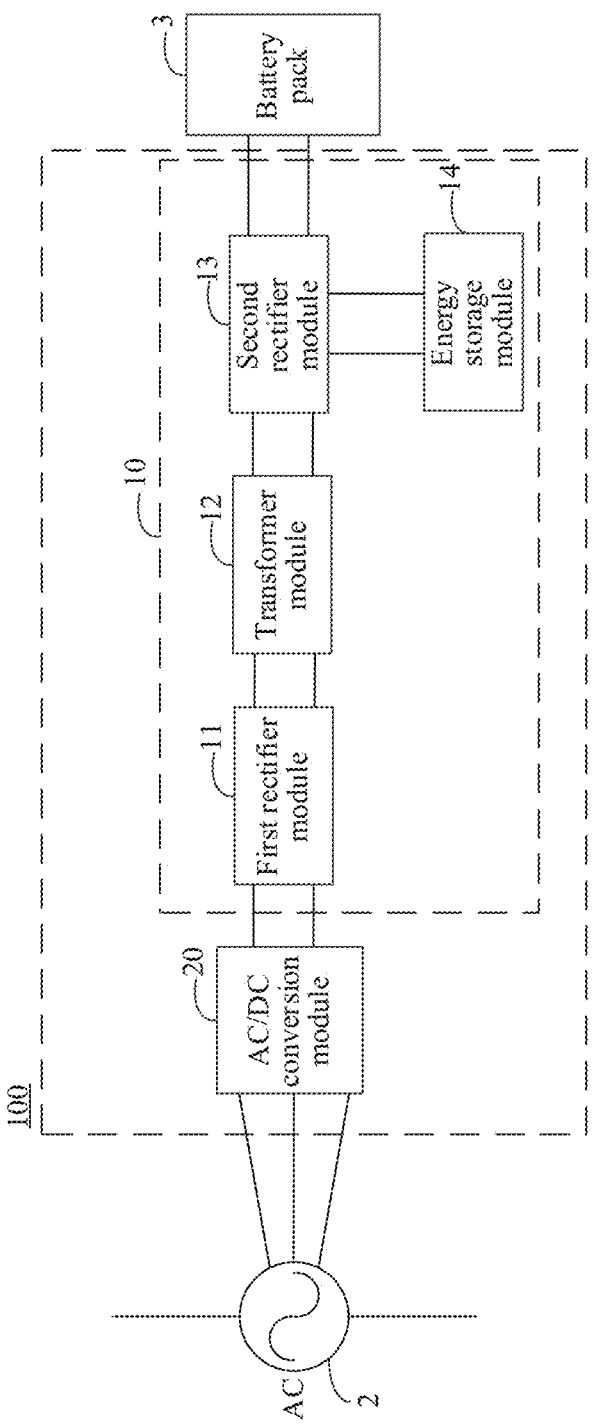
FIG. 1 is a schematic diagram of a module structure of a DC/DC conversion circuit according to an embodiment of this application.

In the accompanying drawings, the figures are not drawn to scale.

Reference signs are described as follows:

100. Charging pile; 1. Power unit; 2. Power grid; 3. Battery pack; 10. DC/DC conversion circuit; 20. AC/DC conversion circuit; 30. Main control module; 11. First rectifier module; 12. Transformer module; 13. Second rectifier module; 14. Energy storage module; L. Energy storage inductor; K1. First switch; K2. Second switch; M1 to M4. First MOS tube to fourth MOS tube.

DETAILED DESCRIPTION OF EMBODIMENTS

The following further describes the embodiments of this application in detail with reference to the accompanying drawings and implementations. The detailed description and accompanying drawings of the following embodiments are used to exemplarily illustrate the principle of this application, but are not intended to limit the scope of this application, that is, this application is not limited to the described embodiments.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims, and the foregoing brief description of drawings of this application are intended to cover a non-exclusive inclusion.

In descriptions of the embodiments of this application, the terms "first" and "second" and the like are merely intended to distinguish between different objects, and shall not be understood as an indication or implication of relative importance or implicit indication of the number, specific sequence, or dominant-subordinate relationship of indicated technical features. In the descriptions of this application, "a plurality of" means at least two unless otherwise specifically stated.

The term "embodiment" described herein means that specific features, structures, or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with other embodiments.

In the descriptions of the embodiments of this application, the term "and/or" in this application describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the descriptions of the embodiments of this application, term "a plurality of" means two (inclusive) or more. Similarly, "a plurality of groups" means two (inclusive) or more groups, and "a plurality of pieces" means two (inclusive) or more pieces.

In the descriptions of the embodiments of this application, the orientations or positional relationships indicated by the technical terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of the embodiments of this application and simplify the descriptions, are not intended to indicate or imply that the apparatuses or components mentioned in this application must have specific orientations, or be constructed and operated for a specific orientation, and therefore shall not be construed as a limitation to embodiments of this application.

In the descriptions of the embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this application based on specific situations.

In the new energy field, a traction battery may be used as a major traction source for an electric apparatus (such as a vehicle, a ship, or a spacecraft), and an energy storage battery may be a charging source for the electric apparatus. The importance of the traction battery and the energy storage battery is taken for granted. As examples instead of limitations, in some application scenarios, the traction battery may be a battery in an electric apparatus, and the energy storage battery may be a battery in a charging apparatus. For ease of description, the traction battery and the energy storage battery may be collectively referred to as a battery below.

At present, batteries on the market are generally rechargeable storage batteries, most of which are lithium batteries, such as lithium-ion batteries or lithium-ion polymer batteries. When a battery is disposed in an electric apparatus, the battery needs to be connected to a charging apparatus for charging if the remaining capacity of the battery is insufficient.

A battery pack of an electric vehicle cannot be charged under low temperature conditions, so the battery pack needs to be heated to a temperature within its operating temperature range. Then, the battery pack can be charged by a charging pile.

In related technologies, a heating module is generally added inside the electric vehicle to quickly heat the battery pack, so as to solve the problem that the battery pack cannot be charged under low temperature conditions. However, entire-vehicle production costs will certainly increase if an extra heating apparatus is provided on every electric vehicle. To reduce the entire-vehicle production costs, related technologies propose that a heating apparatus is provided inside the charging pile and cyclic charging-discharging of the battery pack is performed through the heating apparatus to heat the battery pack. However, a current direction of direct current needs to be switched constantly inside the charging pile for cyclic charging-discharging of the battery pack. As for existing charging piles, one charge-discharge switchover generally takes approximately one second. Such a switchover speed brings out unsatisfying battery pack heating effects. Furthermore, the charge-discharge switchover speed of the charging pile is affected by performance of an internal component, so the switchover speed cannot be increased by adjusting a charge-discharge control mode.

To solve the foregoing problems, embodiments of this application provide a DC/DC (direct current-direct current) conversion circuit, a power unit, a charging pile, and a charge-discharge heating method. The following first describes the DC/DC conversion circuit provided in the embodiments of this application.

FIG. 1 is a schematic diagram of a module structure of a DC/DC conversion circuit 10 according to an embodiment of this application. The DC/DC conversion circuit 10 includes a first rectifier module 11, a transformer module 12, a second rectifier module 13, and an energy storage module 14.

An input end of the first rectifier module 11 is connected to a power grid 2 through an AC/DC (Alternating Current-Direct current, alternating current-direct current) conversion circuit 20. An input end of the transformer module 12 is connected to an output end of the first rectifier module 11. An input end of the second rectifier module 13 may be connected to an output end of the transformer module 12 or the energy storage module 14. An output end of the second rectifier module 13 may be electrically connected to a battery pack 3 of an electric vehicle when a charging pile 100 charges the electric vehicle.

Controlled by the charging pile 100, the input end of the second rectifier module 13 may be connected to the transformer module 12 or the energy storage module 14.

When the input end of the second rectifier module 13 is connected to the transformer module 12, a current loop is formed by the power grid 2, the AC/DC conversion circuit 20, the DC/DC conversion circuit 10, and the battery pack 3. A direct current output direction of the second rectifier module 13 can be adjusted in a cyclic manner to charge the battery pack 3 when a positive pulse current is output and discharge the battery pack 3 when a negative pulse current is output.

When the input end of the second rectifier module 13 is connected to the transformer module 12, a periodic charging-discharging process of the battery pack 3 is as follows:

In the first half cycle of a charge-discharge cycle, the second rectifier module 13 may adjust a current output direction to output a negative pulse current. In this case, the battery pack 3 starts to discharge. This part of electric energy can be fed back to the power grid 2 through the DC/DC conversion circuit 10 and the AC/DC conversion circuit 20, or may be output, through the DC/DC conversion circuit 10 and the AC/DC conversion circuit 20, to an energy storage component disposed in the charging pile 100 and temporarily stored.

In the second half cycle, the second rectifier module 13 may adjust the current output direction to output a positive pulse current. In this case, the power grid 2 can charge the battery pack 3 through the AC/DC conversion circuit 20 and the DC/DC conversion circuit 10.

During charge-discharge cycles, the battery pack 3 is charged and discharged in a cyclic manner and a temperature of the battery pack 3 rises constantly. In this way, the battery pack 3 is heated through cyclic charging-discharging of the battery pack 3.

The current output direction of the second rectifier module 13 can be quickly switched to generate a pulse current of a corresponding frequency, so as to perform charging and discharging at the corresponding frequency on the battery pack 3 of the electric vehicle. When the current output direction of the second rectifier module 13 is adjusted and retained for a period of time, the charging process or the discharging process of the battery pack 3 is implemented. That is, when the second rectifier module 13 is connected to the transformer module 12, not only a positive or negative direct current can be output to charge or discharge the battery pack 3 respectively, but also the periodic positive and negative pulse current can be output to perform periodic charging and discharging on the battery pack 3 to heat the battery pack 3.

When the input end of the second rectifier module 13 is connected to the energy storage module 14, the periodic charging-discharging process of the battery pack 3 is as follows:

In the first half cycle of a charge-discharge cycle, the battery pack 3 can charge the energy storage module 14 through the second rectifier module 13 by adjusting the second rectifier module 13. In the second half cycle, the current output direction of the second rectifier module 13 can be adjusted to discharge the energy storage module 14, so as to charge the battery pack 3. Similarly, the process of charging and discharging the battery pack 3 through the energy storage module 14 can also raise the temperature of the battery pack 3, so as to heat the battery pack 3.

When the second rectifier module 13 is connected to the transformer module 12, a first charge-discharge loop is formed among the power grid 2, the AC/DC conversion circuit 20, the DC/DC conversion circuit 10, and the battery pack 3 to charge and discharge the battery pack 3. When the second rectifier module 13 is connected to the energy storage module 14, a second charge-discharge loop is formed among the energy storage module 14, the second rectifier module 13, and the battery pack 3 to charge and discharge the battery pack 3.

It should be noted that: when the current output direction of the second rectifier module 13 is adjusted to the positive direct current, a current output direction of the first rectifier module 11 also needs to be adjusted accordingly so that a direct current output by the AC/DC conversion circuit 20 can flow to the battery pack 3 sequentially through the first rectifier module 11, the transformer module 12, and the second rectifier module 13. Similarly, when the current output direction of the second rectifier module 13 is adjusted to the negative direct current, the current output direction of the first rectifier module 11 also needs to be adjusted to the negative direct current so that electric energy released by the battery pack 3 can be fed back to the power grid 2 through the DC; DC conversion circuit 10 and the AC/DC conversion circuit 20.

In the first charge-discharge loop, the time for switching the battery pack 3 between a charging state and a discharging state is limited by performance of component of modules of the charging pile 100. For example, the time for switching the battery pack 3 between the charging state and the discharging state may be prolonged by performance of components of the AC/DC conversion circuit 20 inside the charging pile 100 or performance of components of modules other than the second rectifier module in the DC/DC conversion circuit 10. At present, during a test process of charging and discharging the battery pack 3 by using the foregoing first charge-discharge loop, a detected charge-discharge cycle is generally measured in seconds. That is, the battery pack 3 is charged and discharged through the first charge-discharge loop at a lower frequency.

When the second rectifier module 13 is connected to the energy storage module 14, the battery pack 3 is charged and discharged by the second charge-discharge loop formed by the energy storage module 14, the second rectifier module 13, and the battery pack 3. A charge-discharge cycle of the second charge-discharge loop is merely limited by performance of components inside the second rectifier module 13. Therefore, much fewer components impose limitation on the charge-discharge switchover time. In this case, the charge-discharge switchover time greatly becomes shorter, and generally may match the current direction switching frequency of the second rectifier module 13. In this way, high-frequency charging and discharging can be performed on the battery pack 3 through the second charge-discharge loop.

It can be understood that the battery pack 3 can be heated quickly during a high-frequency charge-discharge process so that effects of heating the battery pack 3 are improved. However, the battery packs 3 of some electric vehicles still do not support high-frequency charging and discharging, and if a high-frequency charging and discharging manner, the battery packs 3 may be damaged. For this reason, the battery pack 3 not supporting high-frequency charging and discharging can still be heated in a low-frequency charging and discharging manner.

Based on charge-discharge frequency requirements of the battery packs 3 of different electric vehicles, a first frequency range and a second frequency range may be configured. When the charge-discharge frequency required by the battery pack 3 is within the first frequency range, the charging pile 100 may control the second rectifier module 13 to connect to the transformer module 12, so that the battery pack 3 is charged and discharged by the first charge-discharge loop formed by the power grid 2, the AC/DC conversion circuit 20, the DC/DC conversion circuit 10, and the battery pack 3. When the charge-discharge frequency required by the battery pack 3 is within the second frequency range the charging pile 100 may control the second rectifier module 13 to connect to the energy storage module 14, so that high-frequency charging and discharging is performed on the battery pack 3 through the second charge-discharge loop formed by the energy storage module 14, the second rectifier module 13, and the battery pack 3.

It can be understood that the foregoing first frequency range is smaller than the second frequency range. For example, the first frequency range may be included in the second frequency range. That is, when the battery pack 3 requires low-frequency charging and discharging, the second rectifier module 13 may be connected to either the transformer module 12 or the energy storage module 14 for charging and discharging. When the battery pack 3 requires a charge-discharge frequency that is beyond the first frequency range but within the second frequency range, the second rectifier module 13 is connected to the energy storage module 14 for charging and discharging.

In this embodiment, the energy storage module 14 is disposed. When the battery pack 3 of an electric vehicle requires low-frequency charging and discharging, the charging pile 100 can control the input end of the second rectifier module 13 to connect to the transformer module 12, so that low-frequency charging and discharging is performed on the battery pack 3 through a current loop between the power grid 2 and the battery pack 3 to heat the battery pack 3. When the battery pack 3 supports high-frequency charging and discharging, the charging pile 100 can control the input end of the second rectifier module 13 to connect to the energy storage module 14, so as to perform high-frequency charging and discharging between the energy storage module 14 and the battery pack 3. When the pulse current frequency for charging and discharging the battery pack 3 is high, the temperature of the battery pack 3 can be raised quickly. This implements quick heating of the battery pack 3 and improves heating effects of the battery pack 3. The battery packs 3 of different electric vehicle models may require charge-discharge pulse currents of different frequencies. In this case, low-frequency or high-frequency charging and discharging can be performed on the battery packs 3 according to the frequencies required by the battery packs 3, so as to heat the battery packs 3 of different vehicle models.

Figure 2:
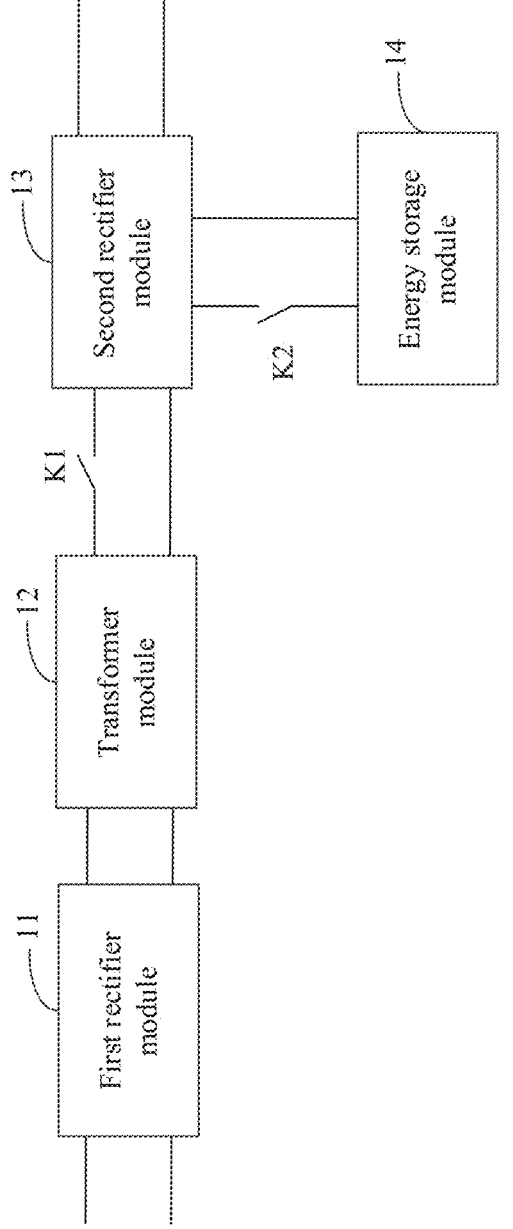
FIG. 2 is a schematic diagram of a module structure of a DC/DC conversion circuit according to another embodiment of this application.

Referring to FIG. 2, in some embodiments, the DC/DC conversion circuit 10 may include a first switch K1 and a second switch K2, the input end of the second rectifier module 13 is connected to the output end of the transformer module 12 through the first switch K1, and the input end of the second rectifier module 13 is further connected to the energy storage module 14 through the second switch K2.

When being on, the first switch K1 can connect the second rectifier module 13 to the transformer module 12. When being on, the second switch K2 can connect the second rectifier module 13 to the energy storage module 14.

When determining that the battery pack 3 of an electric vehicle requires a low-frequency pulse current for charging and discharging, the charging pile 100 may control the first switch K1 to be connected and the second switch K2 to be disconnected, so as to perform low-frequency charging and discharging on the battery pack 3. When determining that the battery pack 3 of an electric vehicle requires a high-frequency pulse current for charging and discharging, the charging pile 100 may control the second switch K2 to be connected and the first switch K1 to be disconnected to quickly raise a temperature of the battery pack 3 through high-frequency charging and discharging, so as to implement quick heating of the battery pack 3.

With the first switch K1 and the second switch K2, the charging pile 100 can output a high-frequency positive or negative pulse current to the battery pack 3 by adjusting on/off statuses of the first switch K1 and the second switch K2, so as to perform high-frequency charging and discharging on the battery pack 3 to heat the battery pack 3.

Figure 3:
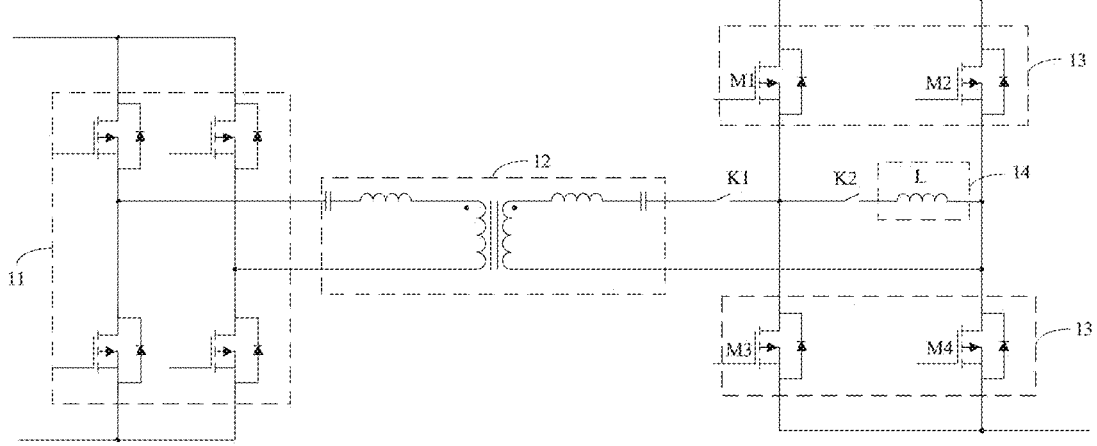
FIG. 3 is a schematic structural diagram of circuits of a DC/DC conversion circuit according to an embodiment of this application.

Referring to FIG. 3, in some embodiments, the second rectifier module 13 may include a first MOS (Metal-Oxide-Semiconductor Field-Effect Transistor, metal-oxide-semiconductor field-effect transistor) tube M1, a second MOS tube M2, a third MOS tube M3, and a fourth MOS tube M4.

A first end of the first MOS tube M1 is connected to a first electrode of the output end of the transformer module 12 through the first switch K1, and a second end of the first MOS tube M1 may be connected to a first electrode of the battery pack 3 when the charging pile 100 is charging the battery pack 3. A first end of the second MOS tube M2 is connected to a second electrode of the output end of the transformer module 12, and a second end of the second MOS tube M2 may be connected to the first electrode of the battery pack 3 when the charging pile 100 is charging the battery pack 3. A first end of the third MOS tube M3 is connected to the first electrode of the output end of the transformer module 12 through the first switch K1, and a second end of the third MOS tube M3 may be connected to a second electrode of the battery pack 3 when the charging pile 100 is charging the battery pack 3. A first end of the fourth MOS tube M4 is connected to the second electrode of the output end of the transformer module 12, and a second end of the fourth MOS tube M4 may be connected to the second electrode of the battery pack 3 when the charging pile 100 is charging the battery pack 3.

When the first switch K1 is connected and the second switch K2 is disconnected, the second rectifier module 13 can charge the battery pack 3 through the foregoing first charge-discharge loop under the condition that the first MOS tube M1 and the fourth MOS tube M4 are connected, and discharge the battery pack 3 through the first charge-discharge loop under the condition that the second MOS tube M2 and the third MOS tube M3 are connected.

When the second rectifier module 13 is connected to the transformer module 12, if the first MOS tube M1 and the fourth MOS tube M4 are conductively connected, the first electrode of the output end of the transformer module 12 is connected to the first electrode of the battery pack 3, and the second electrode of the output end of the transformer module 12 is connected to the second electrode of the battery pack 3. In this case, an alternating current from the power grid 2 can be output, through alternating current to direct current conversion, to the battery pack 3 through the transformer module 12, for charging. If the second MOS tube M2 and the third MOS tube M3 are conductively connected, the first electrode of the output end of the transformer module 12 is connected to the second electrode of the battery pack 3, and the second electrode of the output end of the transformer module 12 is connected to the first electrode of the battery pack 3. In this case, the battery pack 3 can be discharged. This part of electric energy may be fed back to the power grid 2 through the DC/DC module and the AC/DC module, or temporarily stored in an energy storage component of the charging pile 100.

The battery pack 3 can be charged and discharged by controlling alternate connection of the four MOS tubes. Furthermore, an upper limit of the charge-discharge frequency is merely affected by switch frequency performance of the MOS tubes in the second rectifier module 13. The charge-discharge frequency of the battery pack 3 can also be adjusted accordingly by adjusting a frequency of a MOS tube connection signal.

It can be understood that the charge-discharge frequency of the battery pack 3 can reach 2000 Hz according to a state switchover test on the MOS tubes of the second rectifier module 13 composed of the foregoing four MOS tubes. That is, the charge-discharge frequency of the battery pack 3 can be adjusted at least between 0 to 2000 Hz by adjusting the time for switching the connection status of the MOS tubes.

In the foregoing embodiment, the transformer module 12 may use a variety of different topological structures, for example, LLC topology, DAB topology, CLLC topology, CF-DAB topology, and Partial-Power Converter topology. FIG. 3 illustrates a circuit structure in which the transformer module 12 uses the CLLC topology. All the foregoing different topological structures can implement bidirectional direct current voltage regulation, but provide different advantages and disadvantages in terms of gain from direct current voltage regulation, conversion efficiency, and bidirectional switchover frequency. Corresponding topological structures can be used to meet different requirements.

In addition to the foregoing topological structures, the transformer module 12 may use a bidirectional DC-DC converter with a bi-electrode LLC. In the bidirectional DC-DC converter, a Buck-Boost circuit is disposed between the first rectifier module 11 and the AC/DC conversion circuit 20. The transformer module 12 uses a bidirectional LLC-SRC converter. In this case, a maximum switch frequency supported by the first rectifier module 11 and the MOS tubes of the second rectifier module 12 becomes lower when system load increases and becomes higher accordingly when the system load decreases. When the LLC topological structure is used, the switch frequency of the first rectifier module it can be adjusted to change a voltage division ratio of a primary coil of the transformer module 12, so as to release a stable voltage. The transformer module 12 may alternatively be a dual active bridge converter.

In some embodiments, the first end of the first MOS tube M1 may be connected to a first end of the energy storage module 14 through the second switch K2, and the first end of the second MOS tube M2 may be connected to a second end of the energy storage module 14.

When the second switch K2 is connected and the first switch K1 is disconnected, the second rectifier module 13 can discharge the battery pack 3 through the foregoing second charge-discharge loop under the condition that the first MOS tube M1 and the fourth MOS tube M4 are connected, and charge the battery pack 3 through the second charge-discharge loop under the condition that the second MOS tube M2 and the third MOS tube M3 are connected.

The second rectifier module 13 is connected to the energy storage module 14. In phase 1 of a charge-discharge cycle, the first MOS tube M1 and the fourth MOS tube M4 are conductively connected, and the battery pack 3 may discharge to the energy storage module 14 for storing energy. In phase 2, the second MOS tube M2 and the third MOS tube M3 are conductively connected, the energy storage module 14 releases the stored electric energy to charge the battery pack 3. In phase 3, the second MOS tube M2 and the third MOS tube M3 remain in a conductively connected state, the battery pack 3 continues charging the energy storage module 14. In phase 4, the first MOS tube M1 and the fourth MOS tube M4 are conductively connected, the energy storage module 14 releases the stored electric energy to charge the battery pack 3.

It can be understood that the first MOS tube M1 and the fourth MOS tube M4 can remain in the conductively connected state in phase 1 of a next charge-discharge cycle. That is, the foregoing energy storage module 14, a plurality of MOS tubes of the second rectifier module 13, and the battery pack 3 can form an oscillatory circuit. Every time the connection status of MOS tubes is switched, the battery pack 3 is charged and discharged once. This further shortens the charge-discharge cycle of the battery pack 3 and raises a pulse frequency of the charge-discharge current.

It can be understood that: when the second rectifier module 13 is connected to the transformer module 12, the battery pack 3 is charged or discharged once every time the conductive-connection statuses of the MOS tubes inside the second rectifier module 13 is switched. The charge-discharge frequency can be doubled even regardless of influence on the charge-discharge cycle from performance of components in the AC/DC conversion module 20 and the DC/DC conversion module 10 of the charging pile 100.

In some embodiments, the foregoing energy storage module 14 may be an energy storage capacity, an energy storage inductor L, or another energy storage component.

In some embodiments, when the second rectifier module 13 is connected to the transformer module 12, the battery pack 3 whose remaining capacity is lower than a preset capacity threshold can be charged and discharged within a first frequency range, so as to heat the battery pack 3.

When the second rectifier module 13 is connected to the transformer module 12 and the remaining capacity of the battery pack 3 of the electric vehicle is relatively low, the current direction of the second rectifier module 13 can be adjusted to first charge the battery pack 3 during the charge-discharge cycle, so as to initiate the charge-discharge cycle of the battery pack 3.

When the second rectifier module is connected to the energy storage module 14, energy storage is not performed by the energy storage module 14 in an initial phase. Therefore, the battery pack 3 needs to be first discharged in a charge-discharge cycle to store energy into the energy storage module 14. If discharging cannot be performed because the remaining capacity of the battery pack 3 is relatively low, a corresponding charge-discharge cycle cannot be initiated. For example, when a SOC (State of Charge, state of charge) of the battery pack 3 is zero or approaches zero, the battery pack 3 cannot discharge to the energy storage module 14 even when the battery pack 3 is connected to the energy storage module 14 through the second rectifier module 13. In this case, a charge-discharge cycle cannot be initiated.

When the remaining capacity of the battery pack 3 is relatively low, low-frequency charging and discharging can be performed on the battery pack 3 by controlling the second rectifier module 13 to connect to the transformer module 12, so as to heat the battery pack 3.

Figure 4:
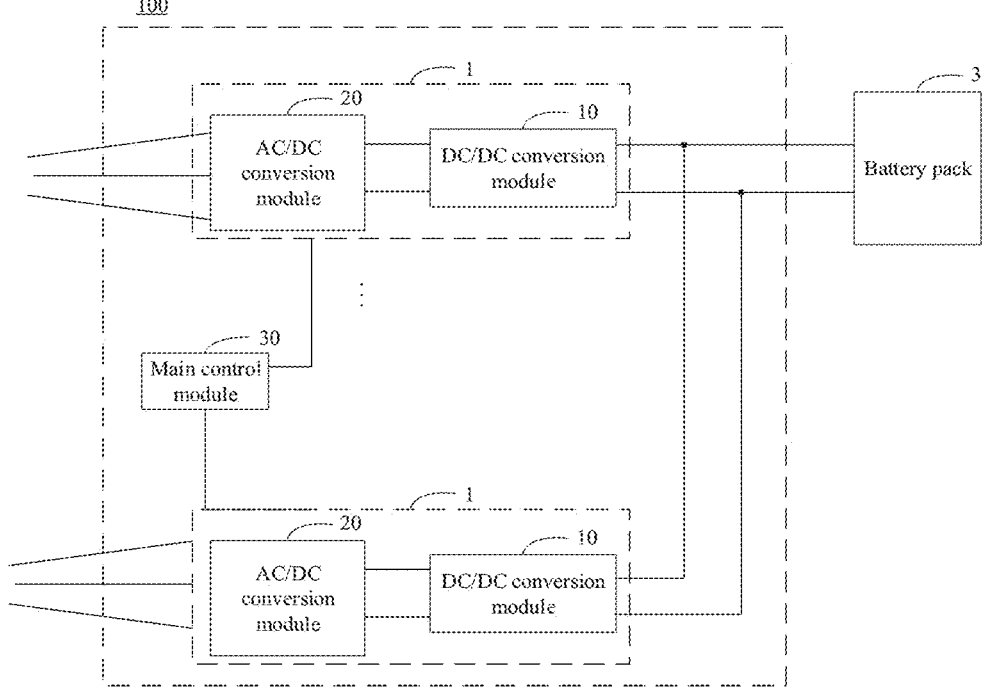
FIG. 4 is a schematic diagram of a module structure of a DC/DC conversion circuit according to still another embodiment of this application.

Referring to FIG. 4, embodiments of this application further a power unit 1, which is applied to the charging pile 100. The power unit 1 includes the DC/DC conversion circuit 10 according to the foregoing embodiments, and the AC/DC conversion circuit 20. An input end of the AC/DC conversion circuit 20 is connected to the power grid 2, and an output end of the AC/DC conversion circuit 20 is connected to the input end of the DC/DC conversion circuit 10.

The charging pile 100 may include the power unit 1 that provides charge power for the battery pack 3. According to a topological structure of the power unit 1, the AC/DC conversion circuit 20 may be connected in series to the DC/DC conversion circuit 10.

To implement charging and discharging of the battery pack 3, the foregoing power unit 1 can be configured to be a bidirectional power unit 1. When the battery pack 3 is being charged and discharged, the AC/DC conversion circuit 20 receives an alternating current from the power grid 2 and converts it into a direct current. The DC/DC conversion circuit 10 receives a direct current from the AC/DC conversion circuit 20, steps down the direct current, and then outputs it to the battery pack 3 for charging. During discharging of the battery pack 3, the DC/DC conversion circuit 10 receives a direct current output by the battery pack 3, steps down the direct current, and then transmits it to the AC/DC conversion circuit 20. The AC/DC conversion circuit 20 converts the direct current into an alternating current and feeds it back to the power grid 2.

It can be understood that although the power unit 1 can implement bidirectional current transmission, the time for switching a current direction is long due to influence from performance of components in the power unit 1. That is, the power unit 1 charges and discharges the battery pack 3 at a relatively low charge-discharge frequency.

An embodiment of this application further provides a charging pile 100. The charging pile 100 includes the power unit 1 according to the foregoing embodiment, and the charging pile 100 further includes a main control module 30. The main control module 30 may be connected to the power unit 1, and controls the second rectifier module 13 of the DC/DC conversion circuit 10 in each of the power units 1 to connect to the transformer module 12 or the energy storage module 14, so as to heat the battery pack 3 by periodically switching a current direction of the second rectifier module 13.

The main control module 30 can control one of a plurality of power units 1 to perform cyclic charging-discharging on the battery pack 3, or control the plurality of power units 1 to simultaneously perform cyclic charging-discharging on the battery pack 3.

It can be understood that when the main control module 30 controls the plurality of power units 1 to perform cyclic charging-discharging on the battery pack 3, the main control module 30 needs to control the plurality of power units 1 to keep charging and discharging simultaneously. For example, all the second rectifier modules 13 in the plurality of power units 1 need to be set to be connected to the transformer module 12 or the energy storage module 14. The second rectifier module 13 in each power unit 1 needs to maintain the same charge-discharge frequency, and maintain a same current direction at a same time point.

Figure 5:
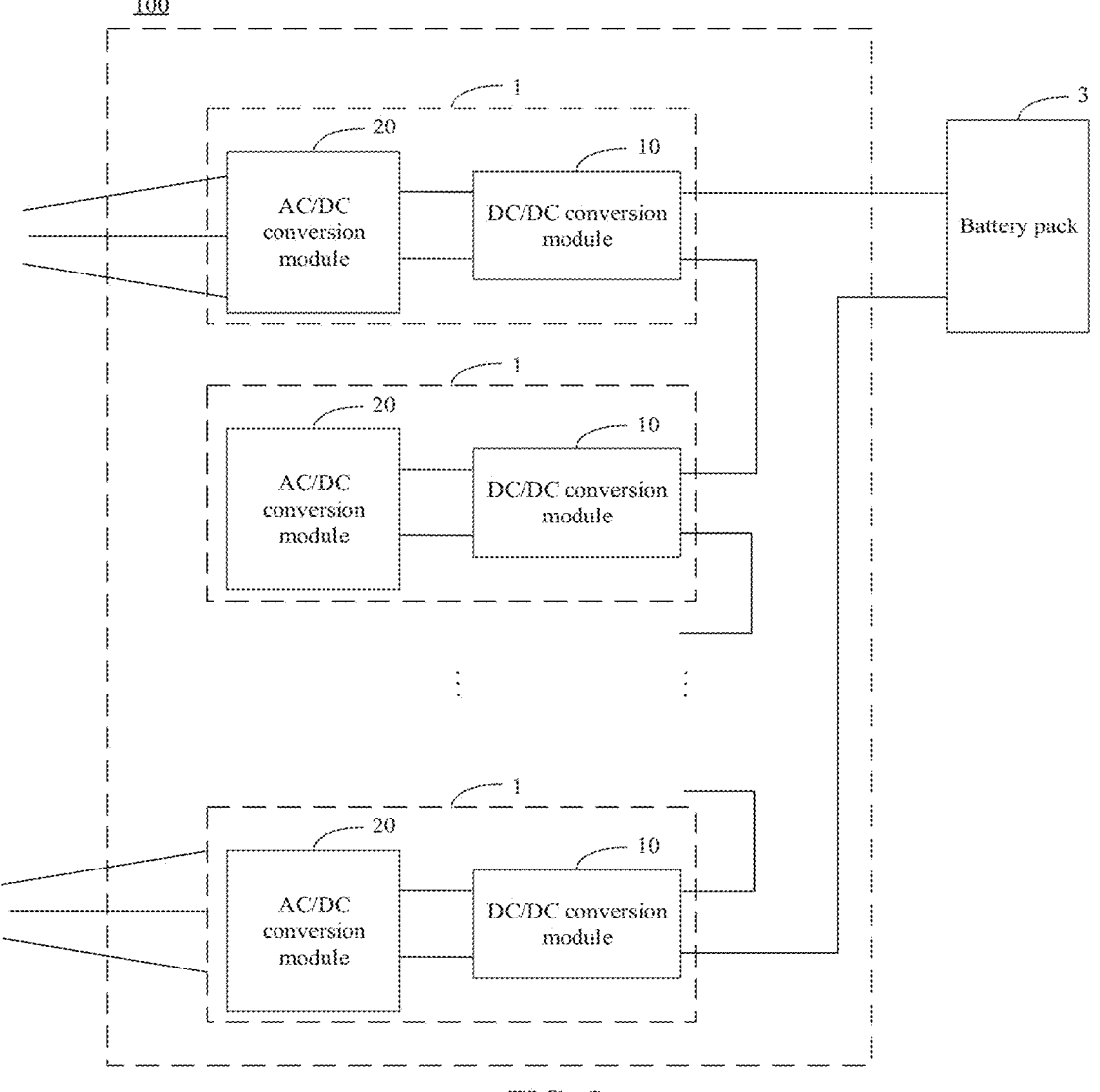
FIG. 5 is a schematic diagram of a module structure of a DC/DC conversion circuit according to yet another embodiment of this application.

Referring to FIG. 5, in some embodiments, the foregoing charging pile 100 may include at least two power units 1, and the main control module 30 may be electrically connected to each of the power units 1.

The main control module 30 may acquire a heating power required by the battery pack 3, and connect the plurality of power units 1 in parallel when the battery pack 3 requires a high heating power, so as to increase the power for heating the battery pack 3. The main control module 30 may alternatively acquire a direct current voltage required for charging and discharging the battery pack 3, and sequentially connect in series output ends of the DC/DC conversion circuits 10 in the plurality of power units 1 when a relatively high direct current voltage is required for charging and discharging the battery pack 3, so as to increase the output voltage.

It can be understood that: the main control module 30 may determine, according to a direct current voltage required for charging and discharging the battery pack 3, a quantity of the power units 1 that need to be connected in series for providing the direct current voltage, and connect in series the output ends of the DC/DC conversion circuits 10 in the quantity of the power units 1.

When the charging pile 100 is charging an electric vehicle, the main control module 30 may acquire a power-on request from the battery pack 3 of the electric vehicle. The power-on request may include a desired heating frequency, a heating current limit, and the like. According to the desired heating frequency, the main control module 30 can determine whether to connect the second rectifier module 13 to the transformer module 12 or connect the second rectifier module 13 to the energy storage module 14.

When determining that the battery pack 3 requires a relatively high heating power, the main control module 30 may further connect the plurality of power units 1 in parallel. The plurality of power units 1 simultaneously charge and discharge the battery pack 3, so as to increase the power for heating the battery pack 3 and implement quick heating of the battery pack 3.

When determining that the battery pack 3 requires a relatively high charging voltage, the main control module 30 may connect in series the output ends of the DC/DC conversion circuits 10 in the plurality of power units 1, so that the direct current voltage at the battery pack 3 is a sum of the output voltages of the plurality of power units 1.

An embodiment of this application further provides a charge-discharge heating method, applied to the charging pile according to the foregoing embodiments. As shown in FIG. 6, the charge-discharge heating method includes the following steps.

S610. Receive a power-on request, where the power-on request instructs a battery apparatus to connect to the charging pile, and the power-on request includes heating frequency information.

S620. In a case in which the heating frequency information is corresponding to a first frequency range, connect a second rectifier module of a DC/DC conversion circuit to a transformer module according to the power-on request, and periodically switch a current direction of the second rectifier module to heat the battery apparatus.

S630. In a case in which the heating frequency information is corresponding to a second frequency range, connect a second rectifier module of a DC/DC conversion circuit to an energy storage module according to the power-on request, and periodically switch a current direction of the second rectifier module to heat the battery apparatus, where the first frequency range is smaller than the second frequency range.

In this embodiment, after being connected to an electric vehicle, the charging pile can receive the power-on request from the electric vehicle. The power-on request can be used to instruct the charging pile to connect to the battery apparatus. The power-on request may include the heating frequency information. The charging pile may determine based on the heating frequency information, a connection mode to be used by the battery pack for cyclic charge-discharge heating, connect the second rectifier module of the DC/DC conversion circuit to a corresponding module, and then switch a current direction of the second rectifier module according to a corresponding frequency. In this way, cyclic charging-discharging can be performed on the battery pack at the corresponding frequency, so as to heat the battery pack during the charge-discharge process. In this way, the temperature of the battery pack can be raised quickly to meet the condition, under which the battery pack is rechargeable. The battery pack that requires a high heating frequency can be charged and discharged at a high frequency, so as to increase a charge-discharge switchover speed and improve battery pack heating effects.

In S610, after a physical connection is established between the charging pile and the electric vehicle, the main control module of the charging pile may communicate with the electric vehicle and acquire the power-on request transmitted by the electric vehicle. The power-on request may indicate the battery apparatus to connect to the charging pile, and may include the heating frequency information. It can be understood that the power-on request may further include a heating current limit to protect the battery pack from an overlarge current used by the charging pile to heat the battery pack, so as to avoid damages imposed by the charging pile to the battery pack caused overlarge current.

In S620, after receiving the power-on request, the main control module may determine, based on the heating frequency information, the charge-discharge mode for heating the battery pack. The heating frequency information may include the heating frequency required by the battery pack. The main control module may preset a first frequency range and a second frequency range. When the heating frequency required by the battery pack corresponds to the first frequency range, the main control module may control the second rectifier module of the DC/DC conversion circuit to connect to the transformer module, and periodically switch the current direction of the second rectifier module to output a pulse current of the corresponding frequency to heat the battery pack.

In S630, after determining that the heating frequency required by the battery pack corresponds to the second frequency range, the main control module may control the second rectifier module of the DC/DC conversion circuit to connect to the energy storage module, and periodically switch the current direction of the second rectifier module to output a pulse current of the corresponding frequency to heat the battery pack.

It can be understood that the foregoing first frequency range and the second frequency range may not overlap each other. For example, the first frequency range may be a heating frequency range that is smaller than a preset frequency threshold f1, and the second frequency range may be a heating frequency range that is larger than the preset frequency threshold f1. Based on whether the heating frequency required by the battery pack is larger than the preset frequency threshold f1, the battery pack can be charged and discharged within the corresponding frequency range for pulse heating.

The electric vehicle may further monitor the temperature of the battery pack, and sends a power-off request to the charging pile when the temperature of the battery pack reaches a temperature indicating the battery pack being rechargeable. The main control module of the charging pile stops heating when receiving the power-off request.

When the battery pack temperature of the electric vehicle reaches the temperature indicating the battery pack being rechargeable, the electric vehicle may further send a charging instruction to the charging pile. The charging pile may connect the second rectifier module to the transformer module according to the charging instruction and configure current directions of the first rectifier module and the second rectifier module accordingly. In this way, an alternating current voltage from the power grid is transformed into a charging voltage corresponding to the battery pack, so as to charge the battery pack. The charging instruction may include parameters such as a direct current charging voltage limit and a current limit of the battery pack.

In some embodiments, after receiving the power-off request from the electric vehicle, the charging pile may further directly connect the second rectifier module to the transformer module and configure the current directions of the first rectifier module and the second rectifier module accordingly, so that the battery pack is charged immediately after heating of the battery pack is completed. In this case, users do not need to wait for completion of heating or trigger a corresponding operation to start charging the batter pack. This improves charging efficiency and charging experience of the users.

When the battery pack is being charged, the electric vehicle may further monitor a real-time capacity of the battery pack. When the real-time capacity of the battery pack reaches a full capacity range, an instruction for stopping charging is sent to the charging pile, so that the charging pile stops charging.

In an optional embodiment, after step S610, the method may further include the following steps, as illustrated in FIG. 7.

S710. Acquire a remaining capacity of the battery pack of the electric vehicle.

S720. When the remaining capacity is lower than a preset capacity threshold, connect the second rectifier module of the DC/DC conversion circuit to the transformer module according to the power-on request, and periodically switch the current direction of the second rectifier module to heat the battery pack.

In this embodiment, the charging pile acquires the remaining capacity of the battery pack of the electric vehicle. If the remaining capacity of the battery pack is relatively low, the charging pile may control the second rectifier module to connect to the transformer module and periodically switch the current direction of the second rectifier module, so as to perform cyclic charging-discharging on the battery pack through a current loop formed by the power grid, the AC/DC conversion module, DC/DC conversion module, and the battery pack. In this way, the battery pack can still be heated through cyclic charging-discharging when the remaining capacity of the battery pack is too low to initiate a charging process of a charge-discharge cycle.

In S710, the charging pile can acquire the remaining capacity of the battery pack of the electric vehicle. After acquiring the remaining capacity of the battery pack, the electric vehicle may add data information of the remaining capacity to the power-on request, so that the charging pile can determine the remaining capacity of the battery pack upon receiving the power-on request. Alternatively, the charging pile may communicate with the electric vehicle after receiving the power-on request and send to the electric vehicle a remaining capacity acquiring request. The electric vehicle may send the detected remaining capacity of the battery pack to the charging pile according to the remaining capacity acquiring request.

In S720, when determining that the remaining capacity of the battery pack is relatively lower than the preset capacity threshold, the charging pile may determine that the battery pack cannot be discharged due to a relatively low capacity. A charge-discharge cycle of the battery pack begins with a discharge. If the battery pack cannot be discharged due to a relatively low capacity, cyclic charging-discharging of the battery pack cannot be initiated properly.

In order to perform charging and discharging to heat the battery pack whose remaining capacity is lower than the preset capacity threshold, the charging pile may connect, according to the power-on request, the second rectifier module of the DC/DC conversion circuit to the transformer module, and periodically switch the current direction the second rectifier module to initiate cyclic charging-discharging of the battery pack.

It can be understood that, for charge-discharge heating on the battery pack whose remaining capacity is lower than the preset capacity threshold, the heating frequency required by the battery pack needs to be within the first frequency range, so that the battery pack can be charged and discharged through a connection between the second rectifier module and the transformer module.

The functional blocks shown in the foregoing structural block diagrams may be implemented as hardware, software, firmware, or a combination thereof. When implemented as hardware, it may be, for example, an electronic circuit, an application specific integrated circuit (ASIC), appropriate firmware, a plug-in, a function card, or the like. When implemented as software, elements of this application are programs or code segments used to perform required tasks. The programs or code segments may be stored in a machine-readable medium, or transmitted over a transmission medium or a communication link by a data signal carried in a carrier wave. The "machine-readable medium" may include any medium capable of storing or transmitting information. Examples of the machine-readable media include an electronic circuit, a semiconductor memory device, an ROM, a flash memory, an erasable ROM (EROM), a floppy disk, a CD-ROM, an optical disk, a hard disk, a fiber optic medium, a radio frequency (RF) link, and the like. The code segments may be downloaded via a computer network such as the Internet or an intranet.

It should be noted the term "include", "comprise", or any of their variants are intended to cover a non-exclusive inclusion, so that a process, a method, an article, or a device that includes a list of elements not only includes those elements but also includes other elements that are not expressly listed, or further includes elements inherent to such process, method, article, or device.

Specific examples are used in this specification to describe the principles and implementations of this application, and the descriptions of the foregoing examples are merely intended to help understand the method and core ideas of this application. The foregoing embodiments are merely preferred embodiments of this application. It should be noted that, due to the limited expression of words, there are objectively unlimited specific structures. Those of ordinary skill in the art may further make several improvements, modifications or changes to this application without departing from the principles of the present application, and the foregoing technical features can also be combined in an appropriate manner; these improvements, modifications or combinations, or direct applications of the ideas and technical solutions of this application in other occasions without improvement should be regarded as falling within the protection scope of this application.

What is claimed is:

1. A DC/DC conversion circuit, applied to a charging pile, wherein the DC/DC conversion circuit comprises:

a first rectifier module, wherein an input end of the first rectifier module is connected to a power grid through an AC/DC conversion circuit;

a transformer module, wherein an input end of the transformer module is connected to an output end of the first rectifier module; and a second rectifier module, wherein an input end of the second rectifier module is configured to connect to an output end of the transformer module or connect to an energy storage module, and an output end of the second rectifier module is configured to connect to a battery pack of an electric vehicle when the charging pile is charging the electric vehicle; wherein the second rectifier module is configured to: connect to the transformer module and perform charging and discharging between the power grid and the battery pack within a first frequency range to heat the battery pack; connect to the energy storage module and perform charging and discharging between the energy storage module and the battery pack within a second frequency range to heat the battery pack; and the first frequency range is smaller than the second frequency range.

2. The DC/DC conversion circuit according to claim 1, wherein the DC/DC conversion circuit further comprises:

a first switch, wherein the input end of the second rectifier module is connected to the output end of the transformer module through the first switch, and the first switch is configured to connect the second rectifier module to the transformer module; and a second switch, wherein the input end of the second rectifier module is connected to the energy storage module through the second switch, and the second switch is configured to connect the second rectifier module to the energy storage module.

3. The DC/DC conversion circuit according to claim 2, wherein the second rectifier module comprises:

a first MOS tube, wherein a first end of the first MOS tube is connected to a first electrode of the output end of the transformer module through the first switch, and a second end of the first MOS tube is configured to connect to a first electrode of the battery pack;

a second MOS tube, wherein a first end of the second MOS tube is connected to a second electrode of the output end of the transformer module, and a second end of the second MOS tube is configured to connect to the first electrode of the battery pack;

a third MOS tube, wherein a first end of the third MOS tube is connected to the first electrode of the output end of the transformer module through the first switch, and a second end of the third MOS tube is configured to connect to a second electrode of the battery pack; and a fourth MOS tube, wherein a first end of the fourth MOS tube is connected to the second electrode of the output end of the transformer module, and a second end of the fourth MOS tube is configured to connect to the second electrode of the battery pack; wherein the second rectifier module is configured to: charge the battery pack when the first MOS tube and the fourth MOS tube are conductively connected; and discharge the battery pack when the second MOS tube and the third MOS tube are conductively connected.

4. The DC/DC conversion circuit according to claim 3, wherein the first end of the first MOS tube is connected to a first end of the energy storage module through the second switch, and the first end of the second MOS tube is connected to a second end of the energy storage module.

5. The DC/DC conversion circuit according to claim 4, wherein the energy storage module is an energy storage inductor or an energy storage capacitor.

6. The DC/DC conversion circuit according to claim 1, wherein the second rectifier module is further configured to: connect to the transformer module, and charge and discharge, within the first frequency range, the battery pack whose remaining capacity is lower than a preset capacity threshold, so as to heat the battery pack.

7. The DC/DC conversion circuit according to claim 1, wherein the first frequency range and the second frequency range are adapted such that the second frequency range accelerates heating of the battery pack.

8. The DC/DC conversion circuit according to claim 1, wherein a plurality of MOS tubes within the second rectifier module are adapted to adjust a charge-discharge frequency of the battery pack up to 2000 Hz.

9. The DC/DC conversion circuit according to claim 1, wherein:

the first frequency range and the second frequency range do not overlap each other, and are defined by a preset frequency threshold, such that:

the first frequency range is a first heating frequency range that is smaller than the preset frequency threshold, and the second frequency range is a second heating frequency range that is larger than the preset frequency threshold.

10. The DC/DC conversion circuit according to claim 1, wherein the first frequency range causes a charge-discharge cycle of the battery pack to be measured in seconds.

11. The DC/DC conversion circuit according to claim 10, wherein the second frequency range is adapted to accelerate heating of the battery pack and improve heating effects of the battery pack.

12. A charging pile, wherein the charging pile comprises a power unit, wherein the power unit comprises a DC/DC conversion circuit, applied to the charging pile, wherein the DC/DC conversion circuit comprises:

a first rectifier module, wherein an input end of the first rectifier module is connected to a power grid through an AC/DC conversion circuit;

a transformer module, wherein an input end of the transformer module is connected to an output end of the first rectifier module; and a second rectifier module, wherein an input end of the second rectifier module is configured to connect to an output end of the transformer module or connect to an energy storage module, and an output end of the second rectifier module is configured to connect to a battery pack of an electric vehicle when the charging pile is charging the electric vehicle; wherein the second rectifier module is configured to: connect to the transformer module and perform charging and discharging between the power grid and the battery pack within a first frequency range to heat the battery pack; connect to the energy storage module and perform charging and discharging between the energy storage module and the battery pack within a second frequency range to heat the battery pack; and the first frequency range is smaller than the second frequency range; and the power unit further comprises an AC/DC conversion circuit, wherein an input end of the AC/DC conversion circuit is connected to a power grid and an output end of the AC/DC conversion circuit is connected to an input end of the DC/DC conversion circuit;

the charging pile further comprises a main control module, and the main control module is connected to each of the power units; and the main control module is configured to connect the second rectifier module in the DC/DC conversion circuit of the power unit to the transformer module or to the energy storage module, and periodically switch a current direction of the second rectifier module to heat the battery pack.

13. The charging pile according to claim 12, wherein the charging pile comprises at least two power units; wherein the main control module is further configured to connect in parallel a plurality of the power units based on a heating power of the battery pack, or connect in series the DC/DC conversion circuits of the plurality of the power units based on a charging voltage of the battery pack.

14. A charge-discharge heating method utilizing a DC/DC conversion circuit including a first rectifier module, a transformer module, a second rectifier module, and an energy storage module, applied to a charging pile, wherein the charge-discharge heating method comprises:

receiving a power-on request, wherein the power-on request instructs a battery apparatus to connect to the charging pile, and the power-on request includes heating frequency information; and in a case in which the heating frequency information is corresponding to a first frequency range, connecting the second rectifier module of the DC/DC conversion circuit to the transformer module according to the power-on request, and periodically switching a current direction of the second rectifier module to heat the battery apparatus; and in a case in which the heating frequency information is corresponding to a second frequency range, connecting the second rectifier module of the DC/DC conversion circuit to the energy storage module according to the power-on request, and periodically switching a current direction of the second rectifier module to heat the battery apparatus, where the first frequency range is smaller than the second frequency range.

15. The charge-discharge heating method according to claim 14, after the receiving a power-on request, further comprising:

acquiring a remaining capacity of a battery pack of an electric vehicle; and under the condition that the remaining capacity is lower than a preset capacity threshold, connecting the second rectifier module of the DC/DC conversion circuit to the transformer module according to the power-on request, and periodically switching the current direction of the second rectifier module to heat the battery pack.

16. The charge-discharge heating method according to claim 14, wherein the first frequency range and the second frequency range are adapted such that the second frequency range accelerates heating of a battery pack.

17. The charge-discharge heating method according to claim 14, wherein a plurality of MOS tubes within the second rectifier module are adapted to adjust a charge-discharge frequency of a battery pack up to 2000 Hz.

18. The charge-discharge heating method according to claim 14, the method further comprising:

defining the first frequency range and the second frequency range such that the first and the second frequency ranges do not overlap each other, and are defined by a preset frequency threshold, such that:

the first frequency range is a first heating frequency range that is smaller than the preset frequency threshold, and the second frequency range is a second heating frequency range that is larger than the preset frequency threshold.

19. The charge-discharge heating method according to claim 14, wherein the first frequency range causes a charge-discharge cycle of the battery apparatus to be measured in seconds.

20. The charge-discharge heating method according to claim 19, wherein the second frequency range is adapted to accelerate heating of the battery apparatus and improve heating effects of the battery apparatus.

* * * * *